Jan. 9, 1951     W. H. SECKEL     2,537,711
VEHICLE RUNNING GEAR
Original Filed Nov. 17, 1944
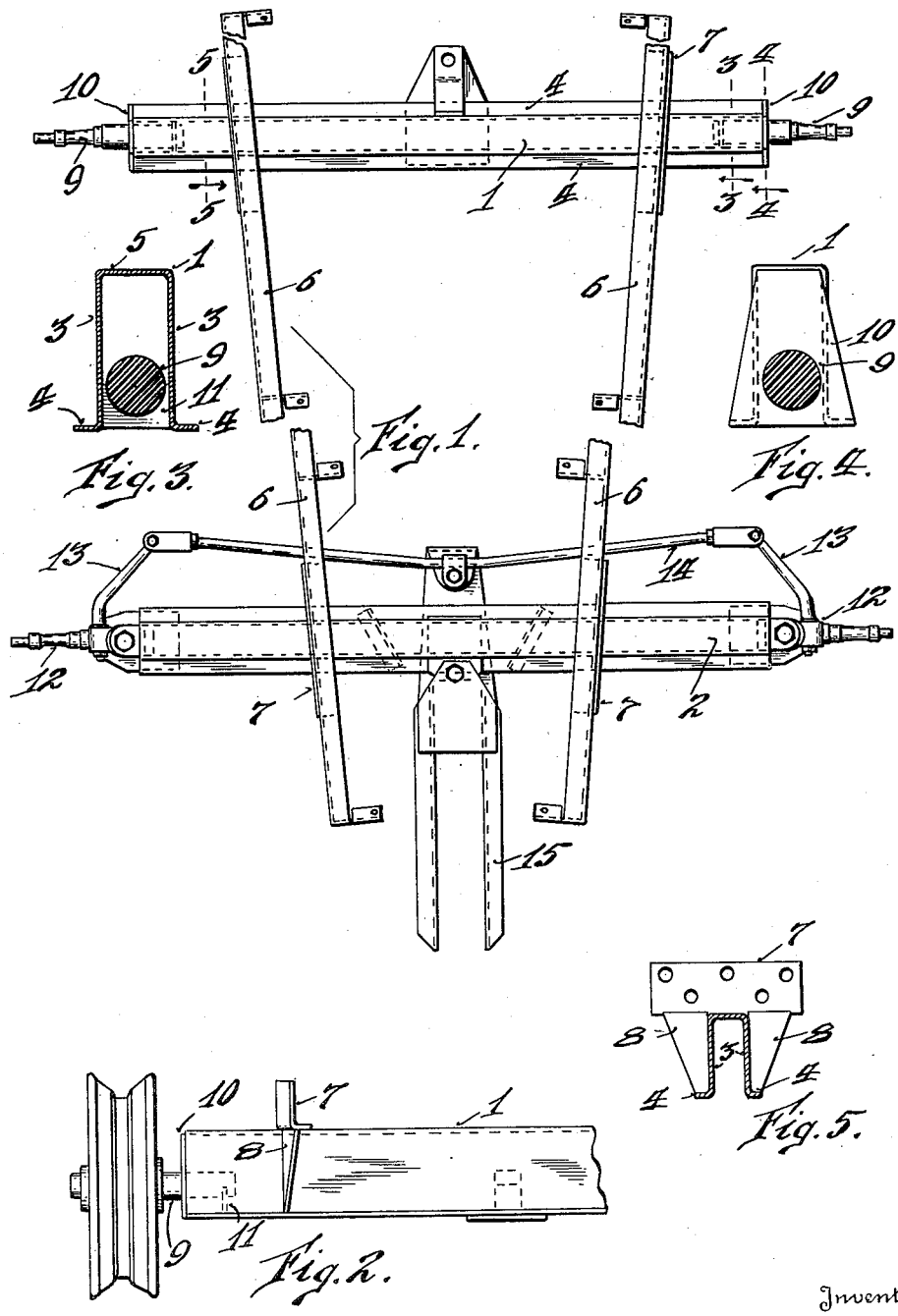

Patented Jan. 9, 1951

2,537,711

UNITED STATES PATENT OFFICE 2,537,711

VEHICLE RUNNING GEAR

Wallace H. Seckel, Galion, Ohio, assignor to The Perfection Steel Body Company, Galion, Ohio, a corporation of Ohio Original application November 17, 1944, Serial No. 563,855. Divided and this application October 1, 1946, Serial No. 700,571

4 Claims. (Cl. 301—131)

This invention relates to improvements in all steel running gear for wagon, trailer or truck service and is divisional of an original application filed Nov. 17, 1944, Serial No. 563,855, Vehicle Running Gear issued Nov. 26, 1946, No. 2,411,836.

The running gear, primarily is directed to the axles, as front and rear, each of channel beam form in cross section having its opposite side walls, each terminating with a lateral outwardly extending flange for the bottom side of the beam and the axles connected by a pair of sills, preferably of channel form in cross section, extending longitudinally of the running gear, as draft transmitting elements and for sustaining a body or cargo carrying platform. The flexibility of the sills maintain all of the wheels, respectively for a four wheel vehicle, in traction bearing upon undulating and rough ground, so that the vehicle is adaptable as a farm wagon, light in weight, sturdy, durable and of low cost in manufacture.

An object of the invention is to provide the axles of a vehicle running gear of structural steel formation in cross section for weight reduction and increased stability, each having wheel journalling spindles, one respectively fixed to and within each of the opposite ends thereof and contiguous therewith.

Another object is to provide a vehicle axle of channel form in cross section, the channel open to the bottom side of the axle and each of its longitudinal ends respectively sealed by a closure plate, welded to the beam, with the stub end of a wheel journalling spindle traversing the closure plate, extending into the channel and fixedly seated within the beam and closure plate.

Further objects and advantages of the invention will be more fully set forth in the following description of the drawings accompanied herewith depicting a preferred embodiment and forming a part hereof, in which:

Figure 1 is a top plan view of the improved four wheel vehicle running gear with the wheels omitted.

Figure 2 is an enlarged side elevation of a section of the rear axle.

Figure 3 is an enlarged section on line 3, 3, Figure 1.

Figure 4 is an enlarged section on line 4, 4, Figure 1.

Figure 5 is a section on line 5, 5, Figure 1.

The running gear, of four wheel type, primarily comprises a front and a rear axle connected by relatively angularly disposed structural steel sills or beams extending longitudinally of the vehicle, resting upon the upper side of the axles and fixed thereto, for the reception of a commercial auto-truck body or direct application of a cargo carrying vehicle platform unit, convertible into a box-like body by removable sides sustained by stakes engaged into the rim of the frame of the platform, to the elimination of bolsters as conventionally employed, one mounted and fixed upon each of the axles respectively. This materially simplifies the structure, reduces its cost, as well as giving sturdiness thereto, while providing for flex or yield when the vehicle is conveyed over rough ground surfaces, so that its utility is enhanced in an extended length of vehicle for agricultural service. The vehicle may be either animal or tractor drawn to function as a trailer.

Referring to the drawings, 1 indicates the rear axle and 2 the front axle, which are of duplicate construction, except for the method of applying the wheel journalling spindles, the spindles for the rear axle being rigid, while for the front are swiveled. The axles are formed from steel plate into a beam of channel or U-shaped in cross section with the opposite side walls 3, 3, each terminating with an outward laterally extended flange 4, longitudinal of the full length of the beam. The beam is disposed with its intermediate wall or flange connecting web 5, uppermost and in a horizontal plane to provide a flat surface for resting and sustaining a pair of sills or beams 6, 6, thereon. The sills 6, preferably, are relatively angularly disposed, converging toward each other toward the forward end of the running gear.

The sills are preferably of channel form in cross section, with the web portion extended vertically or perpendicularly from the top plane of the axle beams, and each is fixed to the front and rear axle beams, respectively by an angle form of bracket plate 7, extending transversely across the axle beam and fixed to the outer side of the web of the sill. The flanges of the sill, preferably are directed inward of the running gear. The bracket plate 7, is fixed to the axle beam by a pair of brace and anchoring plates 8, 8, respectively at opposite outer sides of the side walls of the axle beam, welded to the bracket plate and beam. Thus the bracket with the downwardly extended limbs 8, 8, straddles the axle beam, reinforcing and stiffening the same. The brace plates 8, 8, may be of angle form in cross section and of the length to extend crosswise of the bracket plate, for increased strength. The brackets are preferably bolted to the sills to permit ready substitution of different sills, although the method of fastening is optional.

The rear axle 1, at each of its opposite ends, has a wheel journalling spindle 9, fixed therein and protruding therefrom, preferably of a contour for a tapering roller bearing of conventional type, although its outer end may be of a design for other styles of wheel mounting and class of wheel. The inner or stub end of the spindle is of circular contour and traverses the beam end closure plate 10, welded to the end of the beam. The closure plate 10 is of isosceles trapezoidal outline or figure, and having its lower base end of a width to span the lateral flanges of the beam, as shown in Figure 4, reinforcing and binding the end of the beam. The spindle stub is welded to the beam end closure plate 10, and extends centrally inward of the channel of the beam seating within and welded to a segmental cross or stub plate 11, located within the beam as shown in Figure 3, and welded to the opposite side walls thereof.

The channel beam form of axle construction together with the oppositely extended flanges for the bottom of the beam permits it to be made of a comparatively light gauge of sheet metal and provide the necessary stability and having an open channel at its lower or bottom side, the stocks for mounting and sustaining the wheel journalling spindles and can be conveniently embodied within the opposite ends of the beam and to extend the spindles contiguous therefrom.

The front axle 2, for steering facilities, at each of its opposite ends if equipped with a pivotally mounted wheel journalling and steering spindle 12. The spindle has an angular laterally projecting steering arm 13, with its outer end pivotally connected to a yoke end of a tie rod 14, which connects the steering arms of both spindles for the front wheel. The tie rod is shown as disposed at the rear side of the front axle, and centrally of its length connects with a hitch 15, pivotally mounted upon the axle. The tie rod may be located at the front side of the axle, when there is no necessity to guard the same and the swing or arc of movement of the hitch is limited.

Having described my invention, I claim:

1. A rear axle for a vehicle running gear comprising a beam of channel form in cross-section with the channel exposed to the lower side of the axle, having its opposite side walls each terminating with a lateral outwardly extended flange for the bottom side of the beam, a closure plate respectively for each end of the beam and extensive to cover the ends of the flanges and welded thereto and to the engaging surfaces of the beam, a wheel journalling spindle respectively for each end of the beam and protruding therefrom, each having a stub end traversing the closure plate and welded thereto and a stub plate within the channel of the beam welded to the opposite side walls of the beam providing a support for the stub end of a spindle within the beam and welded thereto.

2. An axle for a vehicle running gear, comprising a structural steel channel beam with the channel exposed to the lower side of the axle and having its opposite side walls each terminating with an outward lateral flange, a plate respectively for each end of the beam of trapezoidal figure with a base end thereof overlying and covering the end of each of said lateral flanges providing a closure for an end of the beam and integrally joined thereto and a wheel journalling spindle for each end of the beam traversing and integrally joined to a closure plate and fixedly seated to the beam within the channel thereof.

3. An axle for a vehicle of channel beam form in cross section having its opposite side walls each terminating with a lateral outwardly extending flange for the bottom side of the beam, a wheel journalling spindle respectively for each end of the beam fixedly mounted within the beam and protruding therefrom, and a pair of plates, one for each of the opposite side walls of the beam and outer side thereof, fixed thereto and relatively in registry to straddle the beam, reinforcing the sides of the beam and adapted for securing a vehicle body carrying sill bearingly upon the beam and extending cross-wise thereof.

4. An axle for a vehicle of channel beam form in cross section having its opposite side walls each terminating with a lateral outwardly extending flange for the bottom side of the beam, a wheel journalling spindle respectively for each end of the beam fixedly mounted within the beam and protruding therefrom, and a pair of plates, one for each of the opposite side walls of beam and outer side thereof, fixed thereto and relatively in registry to straddle the beam, reinforcing the sides of the beam and adapted for securing a vehicle body carrying sill bearingly upon the beam and extending cross-wise thereof, the lower end of each plate bearing upon and fixed to the lateral flange of the side wall, whereby the plate provides a gusset for the wall and flange.

WALLACE H. SECKEL.

REFERENCES CITED

The following references are of record in the file of this patent:

UNITED STATES PATENTS

| Number | Name | Date |
|---|---|---|
| 427,636 | Swalley | May 13, 1890 |
| 2,066,388 | Birkin | Jan. 5, 1937 |
| 2,411,836 | Seckel | Nov. 26, 1946 |

FOREIGN PATENTS

| Number | Country | Date |
|---|---|---|
| 686,438 | Germany | Jan. 9, 1940 |